Nov. 17, 1936.                F. L. CONE                 2,060,975
                        MULTIPLE SPINDLE MACHINE
                        Filed April 8, 1935        2 Sheets-Sheet 1
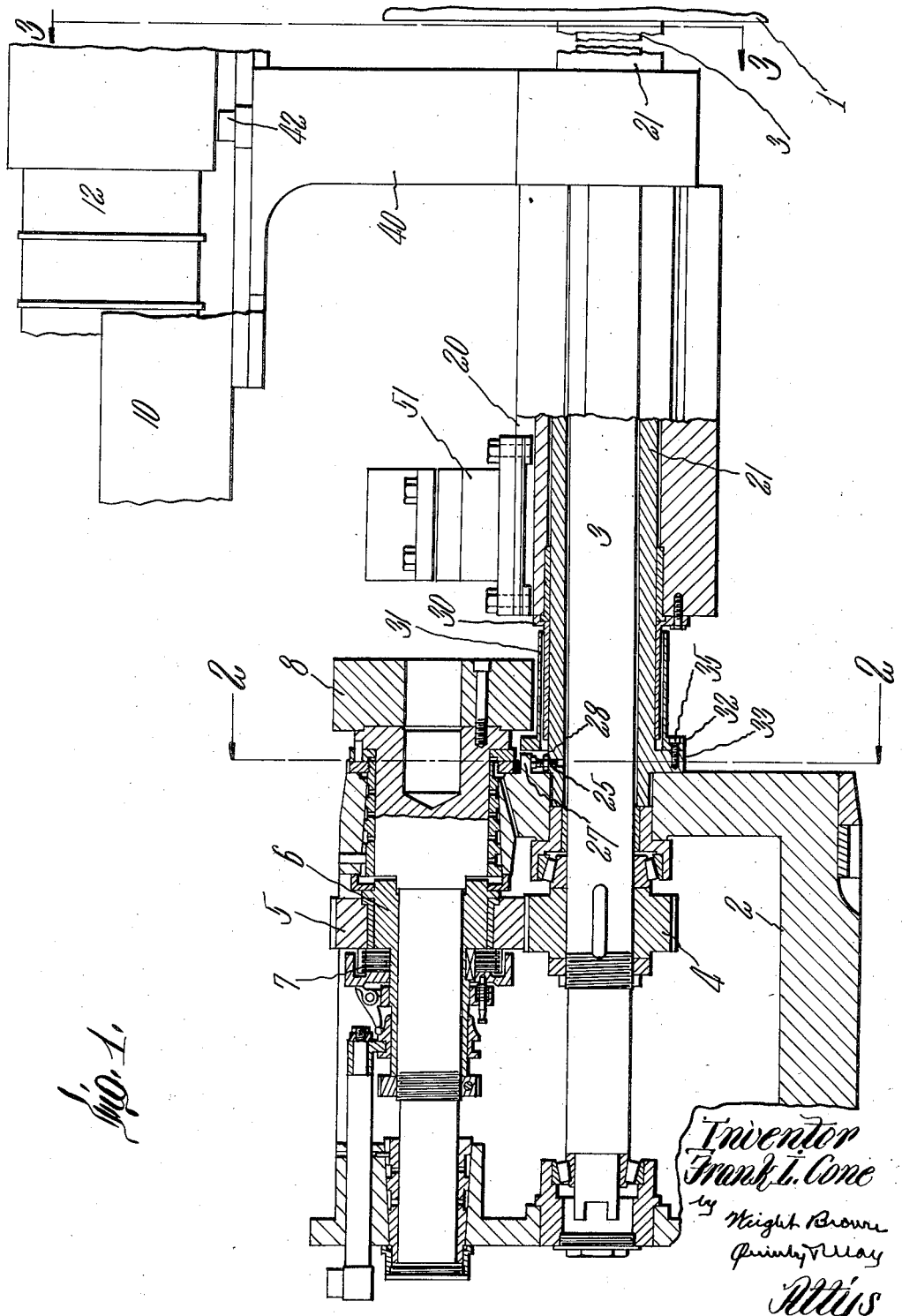

Nov. 17, 1936.   F. L. CONE   2,060,975
MULTIPLE SPINDLE MACHINE
Filed April 8, 1935   2 Sheets-Sheet 2
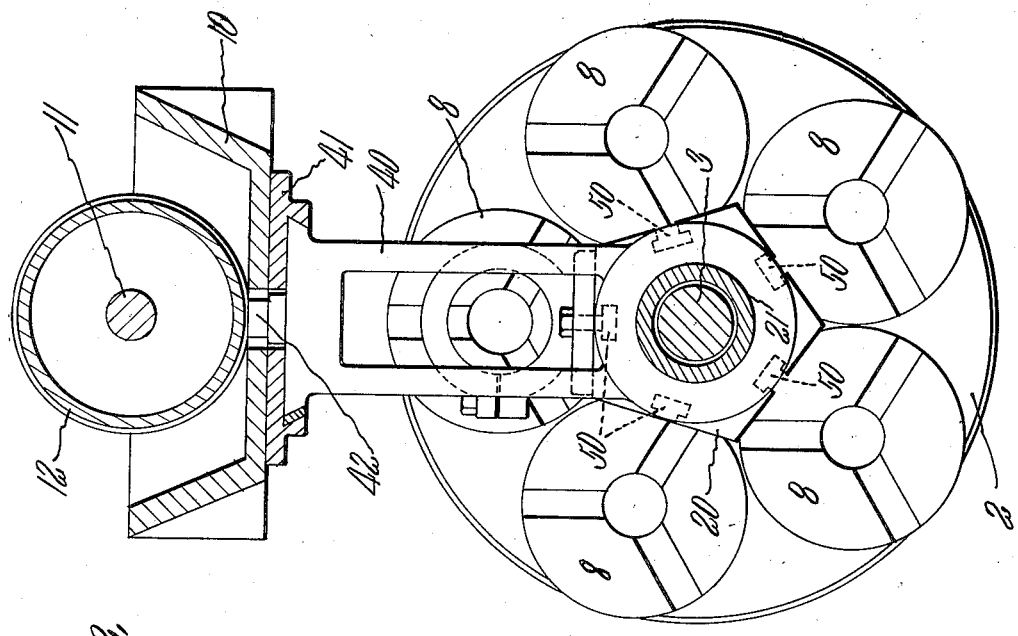
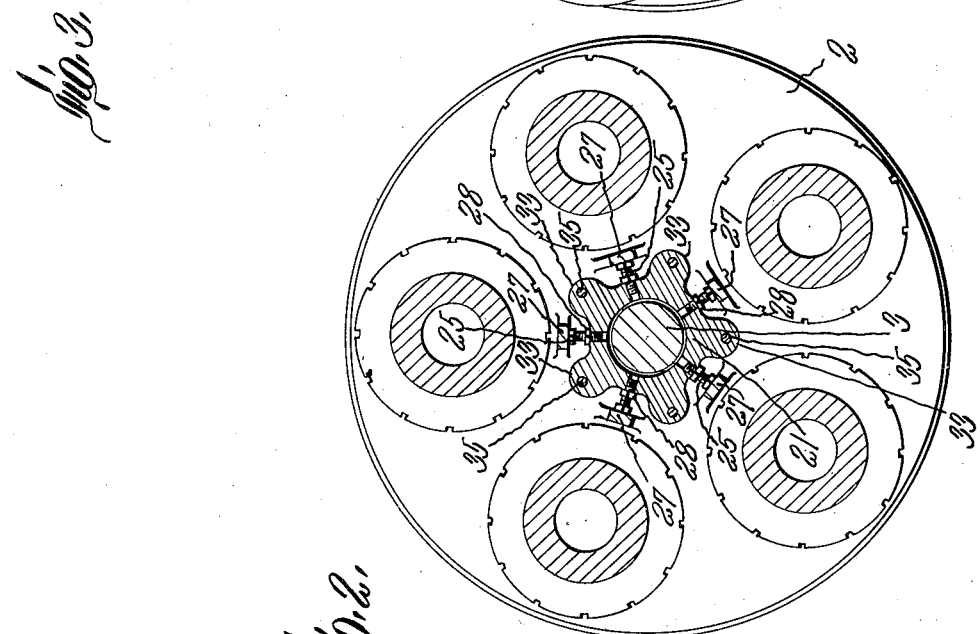
Inventor
Frank L. Cone Patented Nov. 17, 1936

2,060,975

UNITED STATES PATENT OFFICE 2,060,975

MULTIPLE SPINDLE MACHINE

Frank L. Cone, Windsor, Vt.

Application April 8, 1935, Serial No. 15,187

8 Claims. (Cl. 29—38)

This invention relates to multiple spindle machines such as automatic lathes or the like, and is more particularly intended for such a machine in which the spindles are arranged substantially parallel to each other in circular array about the axis of a turret in which the spindles are mounted, and about which axis the turret is indexed.

More particularly this invention relates to the mounting and actuation of movable carriages supporting parts in cooperative relation to parts carried by the spindles. For example, the spindles may carry stock to be operated upon while the carriages hold tools for operating on this work.

To these ends a slide guide is mounted substantially coaxially with the axis of the turret, and a slide is movable axially on this guide toward and from the spindles, this slide having the carriages for the parts for cooperation with the elements carried by the spindles. Such movement of the slide is preferably provided by cam means located above the turret. The slide guide is preferably so arranged also that it may be adjusted to cause the parts carried by the slide to accurately trace the desired paths when the slide is traversed. To this end the guide may be fixed to the turret with the capacity for adjustment in any direction in a plane transverse to this axis.

For a more complete understanding of this invention, reference may be had to the accompanying drawings in which Figure 1 is a fragmentary view partly in vertical central section and partly in elevation of a multiple spindle lathe embodying the invention.

Figures 2 and 3 are detail sections on the correspondingly numbered section lines of Figure 1.

The machine as illustrated is of the general type shown in my Patent No. 1,271,540 of July 9, 1918, comprising a bed from which rise a pair of spaced standards, one of which is shown in part at 1 in Figure 1. The other of these standards provides means for journaling therein a turret shown at 2, this turret being journaled for indexing motion about a substantially horizontal axis. In this axis is arranged a rotary shaft 3 which is journaled in the turret 2 and carries a gear 4 meshing with a plurality of gears 5, one of which is shown in Figure 1, journaled on a spindle 6, provision being made through a suitable clutch mechanism at 7 by which rotation of the gears 5 may be caused to rotate these spindles. These spindles may, if desired, be work spindles and may have secured thereto suitable work-holding devices such as the chuck indicated conventionally at 8. The upstanding frame pieces are joined by a horizontal frame member 10 at their upper ends, as is shown in my prior patent to which reference has been made, and carried by this frame 10, which extends substantially parallel with the turret axis, is arranged a cam shaft 11 (see Figure 3) having drums 12 on which are carried suitable cams for actuating the various mechanisms associated with the work spindles.

In the construction of the present invention certain of these cooperating devices are shown as carried by a slide 20 which is mounted on a tubular support 21 having a cylindrical outer face. This support may be journaled in any suitable manner in the frame member 1 remote from the turret and it is shown as adjustably secured at its opposite end to the turret. This adjustment comprises a plurality of adjusting screws 25 threaded into the support 21 and angularly spaced, corresponding to the angular spacing of the spindles. The heads of these screws make contact with lugs 27 extending out from the adjacent end face of the turret and check nuts as 28 may be provided for locking these screws in adjusted position. The slide 20 is thus journaled on the support 21 which partakes of the indexing motion of the turret, and in order to prevent the entry of chips and the like between the slide and the support, the slide may be provided with a dust guard sleeve 30 extending toward the turret and telescoping within a sleeve 31 shown as provided with ears 32 at its inner end by which it may be secured to mating ears 33 on the support 21 as by the screws 35. The slide 20 may be actuated so as to be moved toward and from the adjacent face of the turret through a lateral extension 40, which as shown best in Figure 3, extends upwardly and is slidably guided in a guide member 41 secured to the lower face of the frame portion 10. This extension is arranged adjacent to the end of the slide 20 remote from the turret and through its engagement with the guide 41 this slide is held from rotation with the support 21. This extension is provided with a cam follower 42 extending through a slot in the guideway 41 and in the base of the frame member 10 into cooperative relation with suitable cams (not shown) which may be secured to the cam drum 12 carried by the cam shaft 11. The slide 20 may have suitable means such as the T slots 50 arranged longitudinally thereof for facilitating securement thereto of devices such as shown at 51 which may carry elements for cooperation with the parts carried by the spindles. For example, where the spindles are work holding spindles the devices 51 may be tool carriers and these devices may be arranged spaced angularly about the slide 20 similarly to the arrangements of the spindles about the turret axis. Due to the much greater distance of the elements carried by the device 51 from the turret axis than are the adjusting screws 25, a very small adjustment produces a much greater motion of these elements so that a relatively small extent of adjustment is required.

From the foregoing description of an embodiment of this invention, it should be evident to those skilled in the art that various changes might be made without departing from the spirit or scope of this invention as defined by the appended claims.

I claim:

1. In a multiple spindle machine, a turret journaled for indexing rotation about an axis, a support substantially coaxial with said turret and extending beyond one face thereof, a plurality of spindles in said turret arranged substantially parallel to said axis and arranged therearound in circular array, a slide mounted on said support, devices carried by said slide for cooperation with and angularly spaced corresponding to said spindles, and means cooperating with said turret for adjusting said support transversely of said axis adjacent to said turret.

2. In a multiple spindle machine, a turret journaled for indexing rotation about an axis, a support substantially coaxial with said turret and extending beyond one face thereof, a plurality of spindles in said turret arranged substantially parallel to said axis and arranged therearound in circular array, a slide mounted on said support, devices carried by said slide for cooperation with and angularly spaced corresponding to said spindles, and means cooperating with said turret for adjusting said support transversely of said axis adjacent to said turret in any direction.

3. In a multiple spindle machine, a turret journaled for indexing rotation about an axis, a support substantially coaxial with said turret and extending beyond one face thereof, a plurality of spindles in said turret arranged substantially parallel to said axis and arranged therearound in circular array, a slide mounted on said support, devices carried by said slide for cooperation with and angularly spaced corresponding to said spindles, means carrying said support remote from said turret, and means cooperating with said turret for adjusting said support transversely of said axis adjacent to said turret.

4. In a multiple spindle machine, a turret journaled for indexing rotation about an axis, a support substantially coaxial with said turret and extending beyond one face thereof, a plurality of spindles in said turret arranged substantially parallel to said axis and arranged therearound in circular array, a slide mounted on said support, devices carried by said slide for cooperation with and angularly spaced corresponding to said spindles, and devices angularly spaced about said support for adjusting said support transversely of said axis.

5. In a multiple spindle machine, a turret journaled for indexing rotation about an axis, a support substantially coaxial with said turret and extending beyond one face thereof, a plurality of spindles in said turret arranged substantially parallel to said axis and arranged therearound in circular array, a slide mounted on said support, devices carried by said slide for cooperation with and angularly spaced corresponding to said spindles, and devices angularly spaced corresponding to the spacing of said spindles about said support for adjusting said support transversely of said axis.

6. In a multiple spindle machine, a turret, a plurality of spindles in said turret arranged in circular array about an axis, a support substantially coaxial with said axis, a slide on said support, devices carried by said slide for cooperation with and angularly spaced corresponding to the angular spacing of said spindles, said turret having lugs extending from one face spaced around said support, and means cooperating with said support and lugs for adjusting said support transverse to said axis.

7. In a multiple spindle machine, a turret, a plurality of spindles in said turret arranged in circular array about an axis, a support substantially coaxial with said axis, a slide on said support, devices carried by said slide for cooperation with and angularly spaced corresponding to the angular spacing of said spindles, said turret having lugs extending from one face spaced around said support, and screws cooperating with said support and lugs for adjusting said support transverse to said axis.

8. In a multiple spindle machine, a turret, a plurality of spindles in said turret arranged in circular array about an axis, a support substantially coaxial with said array and extending from one face of said turret, a slide mounted on said support, devices carried by said slide for cooperation with and angularly spaced corresponding to said spindles, and means cooperating with said turret for adjusting said support transversely of said axis adjacent to said turret.

FRANK L. CONE.